Nov. 25, 1941.  W. A. DALEY  2,263,799

REPORT FORM

Filed Jan. 21, 1941

INVENTOR.
William A. Daley
BY Bates, Teare & McBean
Attorneys.

Patented Nov. 25, 1941

2,263,799

UNITED STATES PATENT OFFICE 2,263,799

REPORT FORM

William A. Daley, Cleveland, Ohio, assignor to The W. S. Gilkey Printing Company, Cleveland, Ohio, a corporation of Ohio Application January 21, 1941, Serial No. 375,221

2 Claims. (Cl. 282—29)

This invention relates to report forms comprising a number of superimposed sheets with intermediate carbons removably mounted on a loose-leaf holder. More particularly, the invention is concerned with car report sheets which are provided with a row of perforations along one edge, some of the sheets, after the record is made thereon, being cut up into narrow strips for distribution, each strip having a perforation adjacent the end for such subsequent filing. The object of the invention is to prevent misregistration of sheets with each other when they are mounted, by means of two of their perforations, on the pins on loose-leaf holder heretofore mentioned.

The invention is in the nature of an improvement on the report book set out in Patent 1,052,414, issued February 4, 1913. The report book shown in that patent has a row of perforations along the left hand marginal edge of some of the sheets which are to be superimposed on the holder, written upon, and thereafter cut up into narrow strips, there being a filing perforation near the end of each strip. The block of sheets is held on the loose-leaf holding platen by reason of two of the perforations being passed over pins projecting upwardly from the base of the holder. Now, it has sometimes happened in the past, in the use of such device, that the pins instead of passing through the intended perforations in all of the superimposed sheets, would occupy other perforations of some of the sheets hidden from view, with the result of misregistration of these sheets, so that the record written, for instance, on strip No. 1 of the top sheet might appear on strip No. 2 of the second sheet.

The present invention overcomes the difficulty by providing the holder with projecting pins of a shape which are not suitable for passing through any of the perforations except those intended, the intended perforations being differently formed from the others and having a shape corresponding to the cross section of the pins.

As an illustration, if most of the perforations are round, I can accomplish my result by making the two perforations which are to be mounted on the pins of substantially square form and by using square pins, so that no sheet can be mounted on the holder in any other than one position, where its two square openings register with its two square pins. This is a great advantage as it prevents those misregistrations, which though only occasionally occurring in practice, are extremely annoying when they do occur, since the result is an improper reporting of the cars. Such inaccuracy may not be discovered until after the strips have been severed and delivered, resulting in difficult tracing and correction.

My invention, which comprises both the looseleaves themselves, perforated in the manner stated, and also their combination with the looseleaf holder, is illustrated in the drawing hereof and hereinafter more fully described.

In the drawing, Fig. 1 is a plan of a holder having mounted thereon a set of my report forms, the forms in this case comprising three wide ruled sheets with interposed carbon sheets and two narrow ruled sheets with two carbon sheets, the sheets are successively broken away, to show a portion of each ruled sheet and a portion of each carbon sheet; Fig. 2 is a fragmentary plan of the left hand marginal portion of any of the three wide sheets; Fig. 3 is a similar marginal plan of either of the narrow sheets; Fig. 4 is an edge view of the sheets mounted on the holder.

In Figs. 1 and 4, A indicates a suitable base panel carrying a pair of upstanding square pins B on which the sheets are mounted and held by spring clips C pivoted to the base bar and swung over the pins and allowed to press down on the paper sheets, the pins passing through openings c in the clips.

Starting with the sheet which rests on the panel A, we have a wide ruled sheet 1 having two square perforations 10. Above this sheet 1, is a carbon sheet 2, which may be similarly perforated. Then, above this, is a sheet 3 which is a duplicate of sheet 1; then a carbon sheet 4, then a third wide sheet 5, which is also a duplicate of sheet 1. Above the topmost wide sheet is a narrower carbon sheet 6 which may have two square perforations, above this a narrow ruled sheet 7. This narrow sheet may be of the form shown in Fig. 3 having a row of perforations along its left hand margin, two of the perforations 11 being square and in the same spaced location as the perforations 10 on sheets 1, 3 and 5, the other perforations on this sheet 7 are round, as indicated at 12. Above the sheet 7 is indicated a carbon sheet 8, and above this is a sheet 9, which is a duplicate of sheet 7, Fig. 3.

When the various sheets, as described, are placed on the square pins B, those pins can pass only through the openings 10 of the wide sheets and the openings 11 of the narrow sheets, and there is no chance of any of the round openings 12 of the narrower sheets being placed over the pins because the round openings are not large enough to embrace such pins. On the other hand, the square openings answer the purpose of perforations in the ends of the narrow strips when the sheets 7 and 9 are cut up for distribution after the record has been made.

It results from the arrangement of the perforations described that improper mounting of any of the sheets is prevented and with the two square openings on the two square pins, the sheets having the rows of perforations necessarily register with each other and with the under sheets 1, 3, and 5, if such are employed. Accordingly, one has absolute assurance, when the sheets 7 and 9 are cut up to make individual narrow strips, that the record on all of such strips corresponds exactly with that on the large sheets.

When the two upper sheets are cut up into narrow strips there will be a perforation at the left hand end of each strip. In most of the strips the perforations will be round as heretofore; on two of them the perforations will be square, but such square perforations are equally available for filing the strip after being severed.

It will be seen that by my invention I have entirely prevented misregistration between surmounting sheets without in any manner altering the manner of the subsequent use of these sheets after they are cut up in individual strips.

I claim:

1. A multiple report form comprising surmounting narrow and wide ruled sheets, a row of perforations along the margin of at least one of the narrow sheets, that sheet being ruled into defined narrow strips which will result when cut along the space indicated by the ruling, one of the perforations being allotted to each narrow strip, two of the perforations in the row, adjacent the respective ends of the row, while having the same relative location as the other perforations, being of different contour and larger size, others of the sheets having only a pair of perforations, which are of the same contour, size and location as the two perforations above-mentioned, whereby when the sheets are mounted on the holder having a pair of pins of corresponding contour and size such sheets can only be mounted when in proper registration to bring all of such special perforations into registration with each other.

2. A multiple report form comprising surmounting sheets for use on a board having pins thereon to receive and support the sheets, the sheets being divided into registerable columns and transverse indications, at least one of the sheets having a row of perforations along one edge thereof and adapted to be cut on said transverse indications into narrow strips, one of the perforations being allotted to each narrow strip, only two of the perforations in the row being constructed and arranged to fit over the pins and being located near the ends of the row, at least one of the pin receiving perforations being disposed intermediate the ends of the row, and another of said sheets having two perforations adapted to register with said pin receiving perforations on said first named sheet.

WILLIAM A. DALEY.